Figure 1:
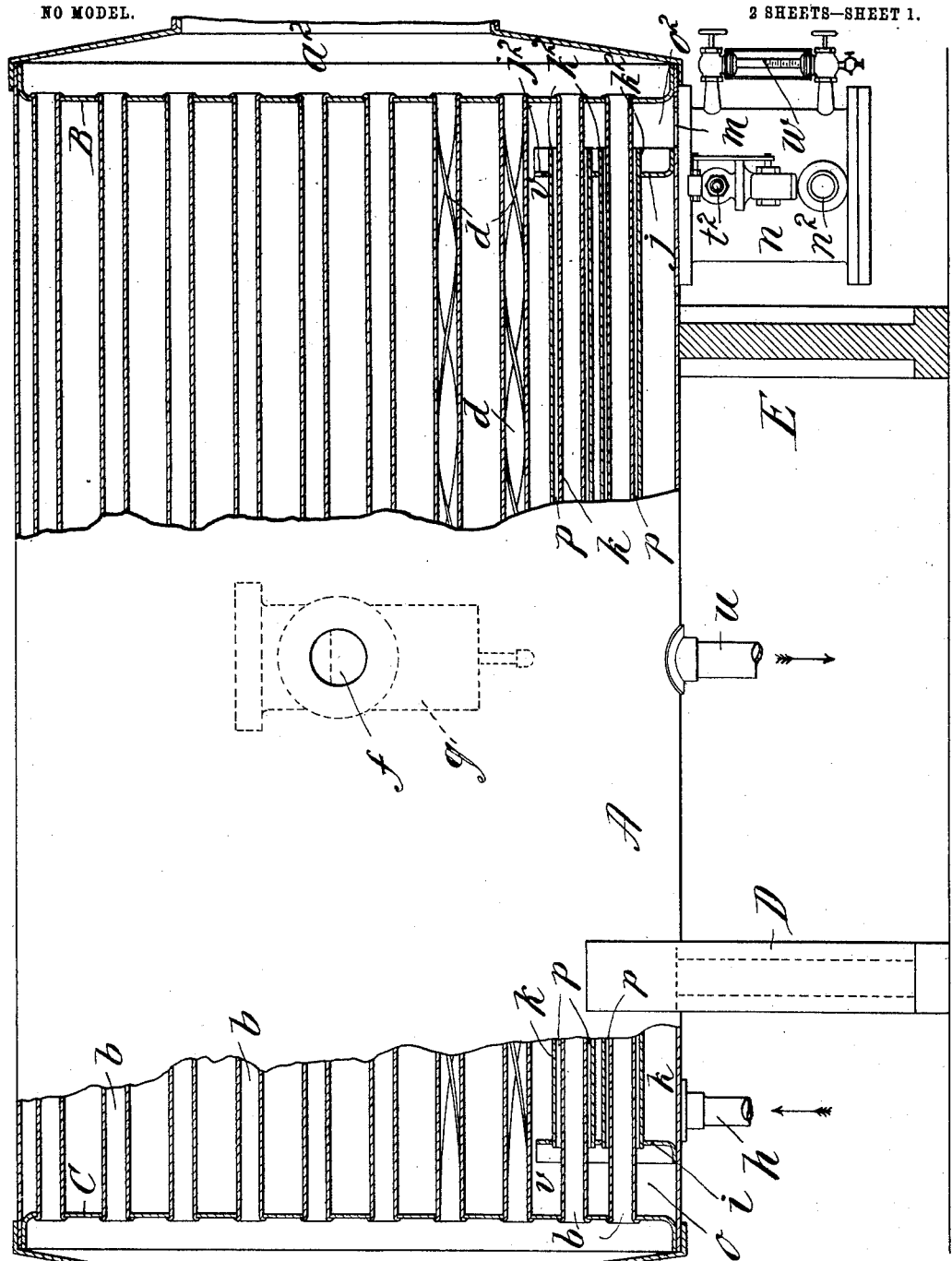

No. 737,562. PATENTED SEPT. 1, 1903.
C. H. ATKINS.
AIR AND WATER HEATING APPARATUS.
APPLICATION FILED APR. 29, 1902.
NO MODEL. 2 SHEETS—SHEET 1.

Witnesses:
Inventor:
Charles H. Atkins
by Wm. F. Bellows,
Attorney.

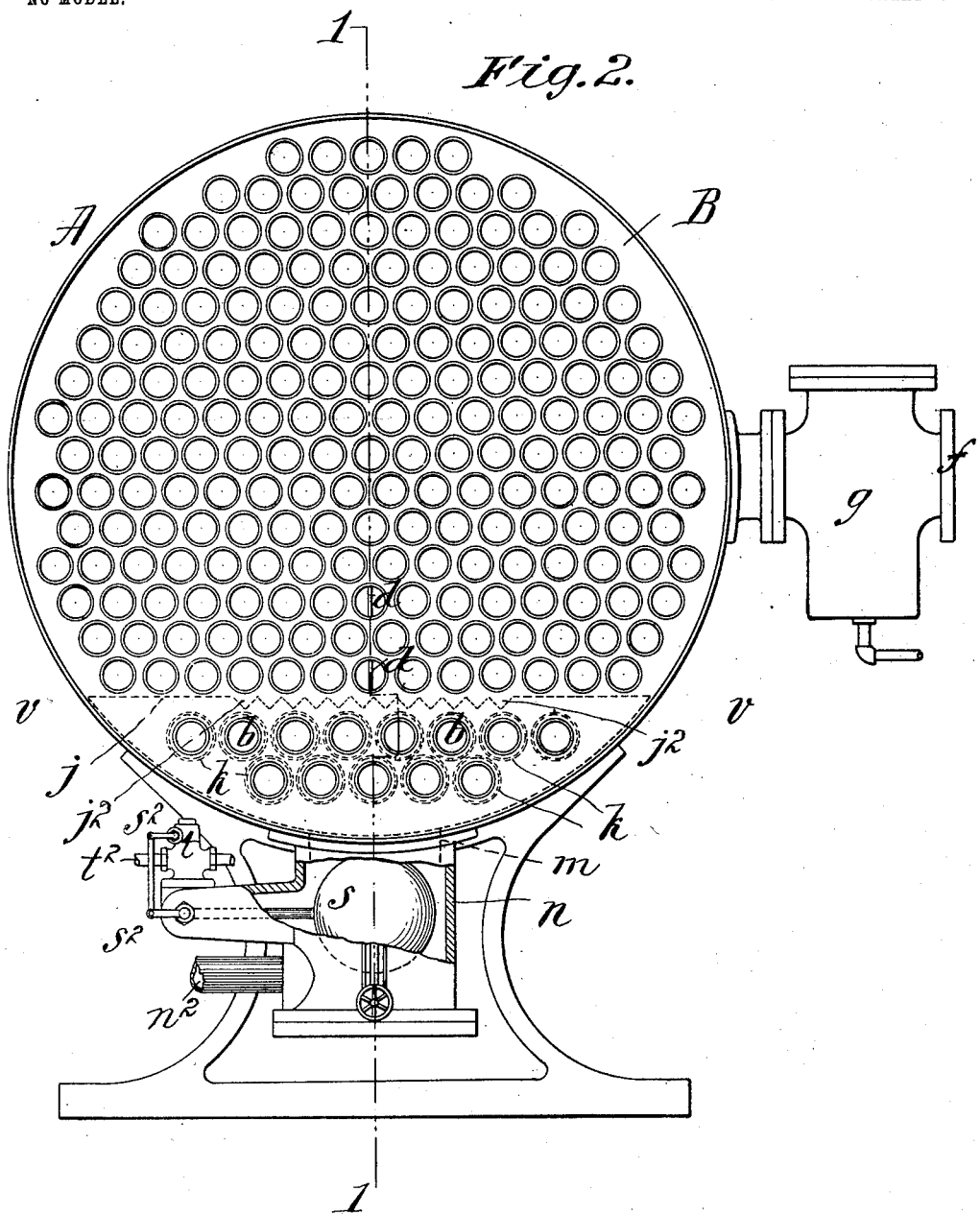

No. 737,562. Patented September 1, 1903.

UNITED STATES PATENT OFFICE.

CHARLES H. ATKINS, OF SPRINGFIELD, MASSACHUSETTS.

AIR AND WATER HEATING APPARATUS.

SPECIFICATION forming part of Letters Patent No. 737,562, dated September 1, 1903.

Application filed April 29, 1902. Serial No. 105,214. (No model.)

*To all whom it may concern:*

Be it known that I, CHARLES H. ATKINS, a citizen of the United States of America, and a resident of Springfield, in the county of Hampden and State of Massachusetts, have invented certain new and useful Improvements in Air and Water Heating Apparatus, of which the following is a full, clear, and exact description.

This invention relates to a caloric transfer—that is, to an apparatus for the purpose of utilizing to the fullest extent the heat contained in the exhaust-steam from a steam-engine or other source.

The object of the invention is to provide an improved means for heating the feed-water for a steam-boiler by means of the exhaust-steam from a steam-engine and also to condense the exhaust-steam and mix the water of condensation with the heated feed-water.

A further object of the invention is to provide, in combination with the above, means for heating a current of air that can be utilized for heating rooms of a building or for any other purpose for which hot air is desirable.

With these objects in view and others my invention comprises the arrangement and construction of parts used separately or in combination, substantially as hereinafter described and then particularly pointed out in the claims.

In the accompanying drawings, representing an apparatus embodying my invention in my preferred form, Figure 1 represents a partial vertical section on the line 1 1 of Fig. 2. Fig. 2 represents an end elevation with the hood removed.

Referring now to the views, in which the characters of reference indicate the same parts, A is a suitable cylindrical receptacle, having end portions B and C and being mounted on supports D and E. One end of the receptacle has a hood $a$ and the other end a hood $a^2$. The end portions B and C of the receptacle are connected by a plurality of tubes $b$, which afford communication between the hoods. Air is forced into the hood $a$, passes through the tubes $b$, and emerges through the hood $a^2$, or, if preferred, its course may be the reverse. If desired, these tubes $b$ may contain strips $d$, spirally arranged for the purpose of imparting a whirling motion to the current of air. The exhaust-steam enters the receptacle A at an inlet $f$, having a chamber $g$, in which may be placed an oil-separator for removing the oil that is mixed with the steam in the cylinder of the engine. The pipe $u$ is a blow-off when it is desired to empty or clear out the receptacle. The feed-water enters the receptacle by the pipe $h$, that is intermediate of two partitions $i$ and $j$. The partition $j$ has recesses $j^2$, as shown in Fig. 2, so that when the water rises to this height and before it could overflow at the top of the left-hand partition $i$ it will overflow into the lower part of the right-hand end of the receptacle and pass through an aperture $m$ into a tank or vessel $n$. In said tank is a ball $s$, pertaining to which are ball-operated levers $s$ $s^2$ $s^3$ and connections to control a valve $t$, which in turn controls the operation of a suction-pump, so that when the heated water in the receptacle $n$ becomes quantitatively sufficient it is pumped away to the boiler or elsewhere for utilization as desired, it being understood that the outlet-pipe $n^3$ of the receptacle $n$ has connection, as the suction-pipe thereof, with a steam-pump, the steam-supply pipe $t^2$ of which is controlled by the automatically-operated valve $t$. A suitable gage-glass $w$ indicates the amount of water in the vessel $n$. A number of tubes $k$ extend from the partition $i$ to the partition $j$ and also project slightly beyond the latter partition, which tubes surround the tubes $b$ at this portion of the receptacle. There is thus provided an annular space $p$ between the interior of the tubes $k$ and the adjacent tubes $b$, that is accessible to the steam in the receptacle A. The steam in this space serves the double purpose of imparting its heat to the current of air passing through these tubes $b$ and also imparting heat to the water that surrounds the tubes $k$ in the trough formed by the partitions $i$ and $j$ and the adjacent bottom portion of the receptacle A, and it will be seen, further, that the feed-water in this trough besides being heated by steam in the annular spaces $p$ will also be heated by the steam in contact with its upper surface. As the water in the trough reaches the notched portion $j^2$ of the partition $j$, it will flow through the notches and upon the outside of the projecting extremities of the tubes $k$ instead of falling upon the adjacent tubes $b$.

Having thus described my invention, what I claim, and desire to secure by Letters Patent, is—

1. In a feed-water heater, the combination of a receptacle; a plurality of horizontal tubes extending through and between the end walls of the receptacle; partitions in the lower portion of the receptacle having their upper portions terminated below the top of the receptacle, and separated from the ends thereof; a plurality of tubes extending between said partitions, each of said latter tubes having one of the said former tubes passing therethrough, with an annular space therebetween; an inlet for steam into the receptacle; an inlet for feed-water into the lower portion of the receptacle; and an outlet for the water between one of said partitions and the adjacent end wall of the receptacle.

2. In a feed-water heater, the combination of a receptacle; a plurality of horizontal tubes connecting the end portions of the receptacle; a partition in the lower portion of the receptacle adjacent each end; a plurality of tubes extending between said partitions, each of said latter tubes having one of the said former tubes passing therethrough, with an annular space therebetween; an inlet for steam into the receptacle; an inlet for feed-water into the receptacle; and an outlet for the water between one of said partitions and the adjacent end of the receptacle; and an apertured hood at each end of the receptacle.

3. In a feed-water heater, the combination of a receptacle; a plurality of horizontal endwise-open air-tubes connecting the end portions of the receptacle; a partition in the lower portion of the receptacle adjacent each end; a plurality of tubes extending between the partitions, each of the latter tubes having one of said former tubes passing therethrough, with an annular space therebetween; an inlet for steam into the receptacle; an inlet for feed-water into the receptacle at its lower part between said partitions; and an outlet for water between one of said partitions and the adjacent end of the receptacle.

4. In a feed-water heater, the combination of a receptacle; a plurality of horizontal tubes connecting the end portions of the receptacle; a partition in the lower portion of the receptacle adjacent each end, one of the partitions having notches below the level of the top of the other partition; a plurality of tubes extending between the partitions, each having one of said former tubes passing therethrough, with an annular space therebetween; an inlet for feed-water into the receptacle at its lower part between the partitions and adjacent the partition not notched; an inlet for steam into the receptacle; and an outlet for the water, located between said notched partition and the adjacent end of the receptacle.

5. In a feed-water heater, the combination of a receptacle; a plurality of horizontal tubes connecting the end portions of the receptacle; a partition in the lower portion of the receptacle adjacent each end, one of the partitions being adapted to permit overflow before the level of the top of the other partition is attained, a plurality of tubes extending between the partitions, each having one of said former tubes passing therethrough, with an annular space therebetween; an inlet for steam into the receptacle; an inlet for feed-water into the receptacle; an outlet for the water, located between one said partition and the adjacent end of the receptacle; a tank into which said outlet leads, a steam-supply pipe for a suction-pump having a lever-operated valve $t$, and a suction-pipe for said pump connected with said tank; and ball-and-lever connections for automatically opening and closing the said steam-valve.

6. In a feed-water heater, the combination of a receptacle; a plurality of horizontal tubes connecting the end portions of the receptacle; a partition in the lower portion of the receptacle adjacent each end; one of the partitions having notches below the level of the top of the other partition; a plurality of tubes extending between the partitions, each having one of said former tubes passing therethrough, with an annular space therebetween; said surrounding tubes projecting beyond the said notched partition; an inlet for water into the receptacle at its lower part between the partitions and adjacent the partition not notched; an inlet for steam into the receptacle; and an outlet for the water located between said notched partition and the adjacent end of the receptacle.

7. In an apparatus of the character described, a closed receptacle having a steam-inlet suitably above its bottom, a trough in the lower portion of said receptacle having the ends thereof at a distance from the ends of the receptacle, and one end of the trough constructed to permit an outflow of water thereat before the level of the top of the other end is attained, a water-inlet to said trough, a series of endwise-open tubes extending from end to end of and through the end walls of the receptacle, endwise-open tubes extending from end to end of the trough and passing through the end walls thereof, and an outlet for the closed receptacle at its lower portion outside of the outflow end of said trough.

8. In an apparatus of the character described, a closed receptacle having a steam-inlet suitably above its bottom, a trough in the lower portion of said receptacle having the ends thereof at a distance from the ends of the receptacle, and one end of the trough constructed to permit an outflow of water thereat before the level of the top of the other end is attained, a water-inlet to said trough, a series of endwise-open tubes extending from end to end of and through the end walls of the receptacle, larger endwise-open tubes extending from end to end of the trough and passing through the end walls thereof, and surrounding certain of the first-named tubes with a longitudinal steam-space between said tubes, and an outlet for the closed receptacle at its lower portion outside of the outflow end of said trough.

9. In an apparatus of the character described, a closed receptacle having a steam-inlet suitably above its bottom, a subsidiary receptacle within the lower portion of said receptacle having the ends thereof at a distance from the ends of the main receptacle, and one end of the trough being constructed to permit an outflow of water thereat before the level of the top of the other end is attained, a water-inlet to said trough, a series of endwise-open tubes extending from end to end, and through the end walls of, the receptacle, endwise-open tubes extending from end to end of the trough and passing through the end walls thereof, said main receptacle having an outlet at its lower portion outside of the outflow end of said trough, a tank into which said outlet leads having the suction-pipe of a pump connected therewith, and a lever-operating bolt therein, a valve controlling the steam for the suction-pump and connections between said ball-lever and said steam-valve, for the purposes set forth.

10. In an air and water heater, the combination of a receptacle; a plurality of substantially horizontal air-tubes extending through and between walls of the receptacle; partitions within the receptacle and separated from the ends thereof, a plurality of substantially horizontal steam-conducting tubes extending through and between said partitions, each of said latter tubes having one of the said air-tubes passing therethrough, with an annular space therebetween; an inlet for steam leading into the receptacle; an inlet for water leading into the receptacle between said partitions, and an outlet for the water between one of said partitions and the adjacent end wall of the receptacle.

Signed by me at Springfield, Massachusetts, in the presence of two subscribing witnesses.

CHARLES H. ATKINS.

Witnesses:
WM. S. BELLOWS,
M. A. CAMPBELL.